(12) United States Patent
Fukumoto (10) Patent No.: US 7,339,802 B2
(45) Date of Patent: Mar. 4, 2008

(54) DC-AC CONVERTER AND CONTROLLER IC THEREFOR

(75) Inventor: Kenichi Fukumoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 11/747,792

(22) Filed: May 11, 2007

(65) Prior Publication Data

US 2007/0211499 A1    Sep. 13, 2007

Related U.S. Application Data

(63) Continuation of application No. 11/428,221, filed on Jun. 30, 2006, now Pat. No. 7,236,377, which is a continuation of application No. 10/501,579, filed as application No. PCT/JP03/11031 on Aug. 29, 2003, now Pat. No. 7,095,635.

(30) Foreign Application Priority Data

Nov. 15, 2002  (JP) ............... 2002-331946

(51) Int. Cl.
*H02M 3/335*   (2006.01)
*H02M 7/521*   (2006.01)

(52) U.S. Cl. ............... 363/21.09; 363/21.11; 363/21.17; 363/98; 363/132

(58) Field of Classification Search ........... 363/16, 363/17, 21.07, 21.1, 21.11, 21.15, 21.18, 363/98, 132, 21.17, 21.09; 323/282, 283, 323/288

See application file for complete search history.

(56) References Cited

U.S. PATENT DOCUMENTS

| | | | |
|---|---|---|---|
| 5,747,982 A | 5/1998 | Dromgoole et al. | 363/21.15 |
| 5,912,552 A | 6/1999 | Tateishi | 323/285 |
| 6,188,585 B1 | 2/2001 | Ikeda et al. | |
| 6,556,457 B1 * | 4/2003 | Shimazaki et al. | 363/34 |
| 6,927,989 B2 | 8/2005 | Fukumoto | |
| 7,095,635 B2 | 8/2006 | Fukumoto | 363/21.11 |
| 7,098,639 B2 | 8/2006 | Natsume et al. | 323/282 |
| 7,236,377 B2 * | 6/2007 | Fukumoto | 363/21.09 |

FOREIGN PATENT DOCUMENTS

| | | |
|---|---|---|
| JP | 56-7493 | 1/1981 |
| JP | 04-190679 | 7/1992 |
| JP | 2000-253663 | 9/2000 |
| JP | 2001-166278 | 6/2001 |

* cited by examiner

*Primary Examiner*—Jessica Han
(74) *Attorney, Agent, or Firm*—Hogan & Hartson LLP (57) ABSTRACT

An inventive inverter has a semiconductor switch circuit connected to the primary winding of a transformer. The semiconductor switch circuit is respectively controlled by PWM to supply a constant current to the load connected to a secondary winding of the transformer. The inverter is capable of deliberately regulating its ac power output to the load and lowering the lower limit of the output power through control of the intermittent operation, in which an error signal for carrying out the PWM control is reduced to zero during each off-duty period. In addition, the error signal for the PWM control is slowly decreased or increased in each shift from an off-duty period to on-duty period, and vise versa, by charging or discharging the capacitor in a feedback circuit, thereby allowing slow start or slow end of the respective on-off operations for the constant current control through the PWM.

16 Claims, 5 Drawing Sheets

DC-AC CONVERTER AND CONTROLLER IC THEREFOR

CROSS-REFERENCE TO THE RELATED APPLICATION

This is a continuation of application Ser. No. 11/428,221 filed Jun. 30, 2006, now U.S. Pat. No. 7,236,377 which is a continuation of application Ser. No. 10/501,579 filed Jul. 15, 2004, now a U.S. Pat. No. 7,095,635, which is a national phase of international application No. PCT/JP03/11031 filed Aug. 29, 2003, which applications are hereby incorporated by reference in their entirety. This application also claims benefit of priority under 35 U.S.C. §119 to Japanese Patent Application No. 2002-331946, filed on Nov. 15, 2002, the entire contents of which are incorporated by reference.

TECHNICAL FIELD

This invention relates to a dc-ac converter (hereinafter referred to as an inverter) for generating an ac voltage to drive a load from a dc power supply unit such as a power supply adapter of an electric apparatus and a battery, and a controller IC for use with the inverter.

BACKGROUND ART

A cold cathode fluorescent light (CCFL) has been increasingly used as a back light source of a liquid crystal display monitor of a notebook PC and of a liquid crystal display (LCD) for use with, for example, a TV set. Such CCFL has substantially the same high efficiency and long life as a usual hot cathode fluorescent light, without using a filament of the hot cathode fluorescent light.

In order to start up and operate the CCFL, a high ac voltage is required. For example, a startup voltage of about 1000 V and an operating voltage of about 600 V are required. These high ac voltages are generated from a dc power supply unit of, for example, a notebook PC and a liquid crystal TV set, using an inverter.

Conventionally, a Royer circuit has been used as an inverter for the CCFL. The Royer circuit comprises a saturable magnetic core transformer and a control transistor and is adapted to undergo a self-sustaining oscillation owing to the nonlinear permeability of the saturable magnetic core and the nonlinear current gain characteristic of the control transistor. The Royer circuit itself requires no external clock or driver circuit.

However, a Royer circuit is basically a constant-voltage inverter, which cannot maintain a constant output voltage if the input voltage thereto and/or the load current thereof varies. Hence, in order to maintain a constant input voltage to the Royer circuit, a regulator for supplying constant electric power to the Royer circuit is required. For this reason, the inverter utilizing a Royer circuit cannot be easily miniaturized, and has low power inversion efficiency.

A CCFL inverter having improved power conversion efficiency has been disclosed (see for example Japanese Patent Application H10-50489). This inverter comprises a first semiconductor switch connected in series with the primary winding of a transformer, a serially connected second semiconductor switch and a capacitor which are connected in parallel with the primary winding, and a coupling capacitor and a load connected in series with the secondary winding of the transformer. The first and second semiconductor switches are switched on and off by a control signal received from a control circuit to supply ac power to the load.

A full bridge (often called H bridge) type CCFL inverter utilizing four semiconductor switches has been proposed (see for example U.S. Pat. No. 6,259,615). This inverter has a transformer having its primary winding connected to the output end of the full bridge via a resonant capacitor connected in series with the primary winding. The load is connected to the secondary winding of the transformer. Of the four semiconductor switches constituting the full bridge, a first set of two semiconductor switches establishes a current path in a first direction to the primary winding of the transformer and a second set of two semiconductor switches establishes a current path in a second direction to the primary winding. A control circuit provides the full bridge semiconductor switches with control signals each having a fixed pulse width and a controlled relative position of the pulse, thereby regulating the power given to the load. Over-current protection is carried out by detecting the voltage across the secondary winding of the transformer.

There has been known an inverter for providing constant power through intermittent operation of a switching circuit controlled by PWM, the inverter adapted to detect the current flowing through the CCFL and regulate the duty factor (or the ratio of on-duty period to off-duty period) of the intermittent operation so as to maintain the current constant, as disclosed in Japanese Patent Application 2002-221701.

In conventional inverters, power supplied to a load is controlled by controlling conduction period (referred to as on-duty period) of a semiconductor switch so as to maintain the load current at a predetermined level. The power supplied to the load can be reduced by decreasing the width of the control pulse for enabling the associated semiconductor switches. However, in an attempt to minimize power supply, the width of the control pulse cannot be decreased arbitrarily small without sacrificing the stability of the inverter. Therefore, it is difficult to lower the lower limit of dimmer control for a load (such as CCFL).

Moreover, in a conventional inverter adapted to control only the ratio of on-duty period to non-conduction period (referred to as off-duty period) of the intermittent operation, fine dimmer control is difficult.

Further, conventional inverters cannot prevent an over-current and/or over-voltage from being supplied to the load (CCFL) during a startup of the inverter due to a loop-delay in constant current control or an operational delay in over-voltage protection. Moreover, when the control pulse rises or falls for the intermittent operation of the inverter, the condition of the inverter changes drastically, which entails an overshoot in the output current particularly during a rise. Such over-current and over-voltage impose a strong stress on the CCFL, thereby shortening the life of the CCFL. In addition, major components of the inverter such as a transformer, a semiconductor switch, and a battery must be constructed to withstand over-current and over-voltage.

It is, therefore, an object of the invention to provide an inverter having a semiconductor switch circuit connected to the primary winding of a transformer such that the switches of the semiconductor switch circuit are respectively controlled by pulse width modulation (PWM) to supply a constant current to the load connected to a secondary winding of the transformer, wherein said inverter has additional means for controlling intermittent operation of the switches to provide fine regulation of power supplied to the load over a broad range. It is another object of the invention to provide a controller IC for use with such inverter.

It is a still another object of the invention to provide an inverter for providing a constant output current through PWM of a switching circuit and through control of the intermittent operation of the switching circuit such that a rapid change in the current that accompanies the intermittent operation can be suppressed by a structure that is different from slow start means for slowly starting up the inverter. It is a further object of the invention to provide a controller IC for use with such inverter.

DISCLOSURE OF INVENTION

An inverter in accordance with one aspect of the invention comprises:
 a dc power supply;
 a transformer having a primary winding and at least one secondary winding;
 a semiconductor switch circuit for passing a current alternately in a first direction and a second direction from the dc power supply to the primary winding;
 a load connected to the secondary winding;
 a current detection circuit for detecting the current flowing through the load to generate a current detection signal indicative of the current detected;
 a PWM triangular wave signal generation circuit for generating a triangular wave signal for use in PWM (the triangular wave signal referred to as PWM triangular wave signal);
 a PWM control signal generation circuit for generating a PWM control signal upon receipt of the PWM triangular wave signal and current detection signal by
  generating an error signal based on the current detection signal; and
  comparing the error signal with the PWM triangular wave signal to generate the PWM control signal; and
 an intermittent operation control circuit for setting the level of the error signal to substantially zero based on an intermittent operation signal during an off-duty period of the intermittent operation of the switch circuit, wherein
 the semiconductor switch is switched on and off by the PWM control signal.

An inverter in accordance with another aspect of the invention comprises:
 a dc power supply;
 a transformer having a primary winding and at least one secondary winding;
 a semiconductor switch circuit for passing a current alternately in a first direction and a second direction from the dc power supply to the primary winding;
 a load connected to the secondary winding;
 a current detection circuit for detecting the current flowing through the load to generate a current detection signal indicative of the current detected;
 a voltage detection circuit for detecting the voltage impressed on the load to generate a voltage detection signal indicative of the voltage detected;
 a PWM triangular wave signal generation circuit for generating a triangular signal for pulse width modulation (the triangular wave signal referred to as PWM triangular wave signal);
 a PWM control signal generation circuit for generating a PWM control signal upon receipt of the PWM triangular wave signal, current detection signal, and voltage detection signal by
  generating an error signal based on the current detection signal and voltage detection signal; and
  comparing the error signal and the PWM triangular wave signal to generate the PWM control signal, and
 an intermittent operation control circuit for setting the level of the error signal to substantially zero based on an intermittent operation signal during an off-duty period of the intermittent operation, wherein
 the semiconductor switch circuit is switched on and off based on the PWM control signal.

A controller IC for driving a semiconductor switch circuit to control the ac output power thereof to be supplied to a load in accordance with the invention comprises:
 a PWM triangular wave signal generation block, connected to an external capacitor (oscillation capacitor) and a resistor (oscillation resistor) for establishing oscillation, for generating a PWM triangular wave signal;
 a PWM control signal generation circuit for generating a PWM control signal, the PWM control signal generation circuit adapted to
  receive the PWM triangular wave signal, current detection signal obtained by detecting the current flowing through the load and voltage detection signal obtained by detecting the voltage across the load;
  generate an error signal based on the current detection signal and voltage detection signal;
  compare the error signal with the PWM triangular wave signal to generate the PWM control signal; and
 an intermittent operation control circuit for setting the level of the error signal to substantially zero based on an intermittent operation signal during each off-duty period of the intermittent operation, wherein
 the semiconductor switch is switched on and off by the PWM control signal.

The PWM control signal generation circuit may include
 an error signal generation circuit for automatically selecting and outputting as the error signal one of a current error signal and a voltage error signal in accordance with the magnitude of a current error signal and the magnitude of the voltage error signal, the current error signal generated based on the difference between the current detection signal and a reference current signal, and the voltage error signal is generated based on the difference between the voltage detection signal and a reference voltage signal; and
 a PWM signal comparator adapted to compare the PWM triangular wave signal with the error signal to generate the PWM control signal, wherein
 the intermittent operation control circuit is connected to the error signal generation circuit and includes an intermittent operation control element that is switched on and off in accordance with the intermittent operation signal such that the level of the error signal reduces to substantially zero in an off-duty period of the intermittent operation.

The error signal generation circuit may include:
 a first error amplifier for comparing the current detection signal and the current reference signal to generate a first error output;
 a second error amplifier for comparing the voltage detection signal and the reference voltage signal to generate a second error output;
 a first control element controlled by the first error output; and
 a second control element controlled by the second error output, wherein
 the output ends of the first and second control elements are connected with each other to output the error signals from the node thereof (the node referred to as interconnection node), and
 the intermittent operation control circuit is adapted to set either the current detection signal supplied to the first error amplifier or the second error signal supplied to the second error amplifier to a predetermined level to thereby substantially zeroing the error signal.

The controller IC may include a first feedback capacitor connected between said interconnection node and the input end of said first error amplifier receiving said current detection signal; and a second feedback capacitor connected between said interconnection node and the input end of said second error amplifier receiving said voltage detection signal, thereby allowing the error signal to change slowly in a shift between an on-duty and an off-duty period of the intermittent operation.

The inverter may have a triangular wave signal generation circuit (referred to as intermittent operational triangular wave signal generation circuit) for generating a triangular wave signal for intermittent operation of the intermittent operation control element and a comparator for comparing the intermittent operational triangular wave signal with a duty signal to generate the intermittent operation signal in accordance with the comparison.

The load can be a cold cathode fluorescent light (CCFL).

The inventive inverter and controller IC therefor are adapted to perform PWM control on the semiconductor switches of the semiconductor switch circuit (i.e. control the semiconductor switches through PWM) so as to supply a constant current to a load, wherein the intermittent operation of the switches is further controlled to provide fine regulation of the power output to the load over a broader range of the output power. In controlling the intermittent operation, the level of the error signal for performing PWM is set to substantially zero during off-duty periods. Thus the inventive inverter can be of simple structure.

In the controlled intermittent operation, the capacitor of a feedback circuit for the PWM control is charged so as to zero the error signal for the PWM control in a shift from on-duty period to off-duty period, and discharged so as to raise the error signal from zero in a shift to on-duty period. This allows the error signal to slowly change while making a shift between on and off duty periods in the intermittent operation. In this way, since the PWM for constant current control undergoes slow start or slow end while making shifts between on- and off-duty periods of the intermittent operation, rapid changes in the controlled load current, overshooting of the output current, and hamming of the transformer can be-suppressed.

Since the slow start and slow end of the intermittent operation are carried out by charging and discharging the capacitor of the feedback circuit, the length of the slow start and slow end can be set arbitrarily short, independently of the slow start of the startup of the inverter, in a manner appropriate to the intermittent operation of the inverter.

BEST MODE FOR CARRYING OUT THE INVENTION

Referring to the accompanying drawings, the invention will now be described in detail with reference to an inverter, along with a controller IC therefor, for generating from a dc power supply an ac voltage to drive a load.

Figure 1:
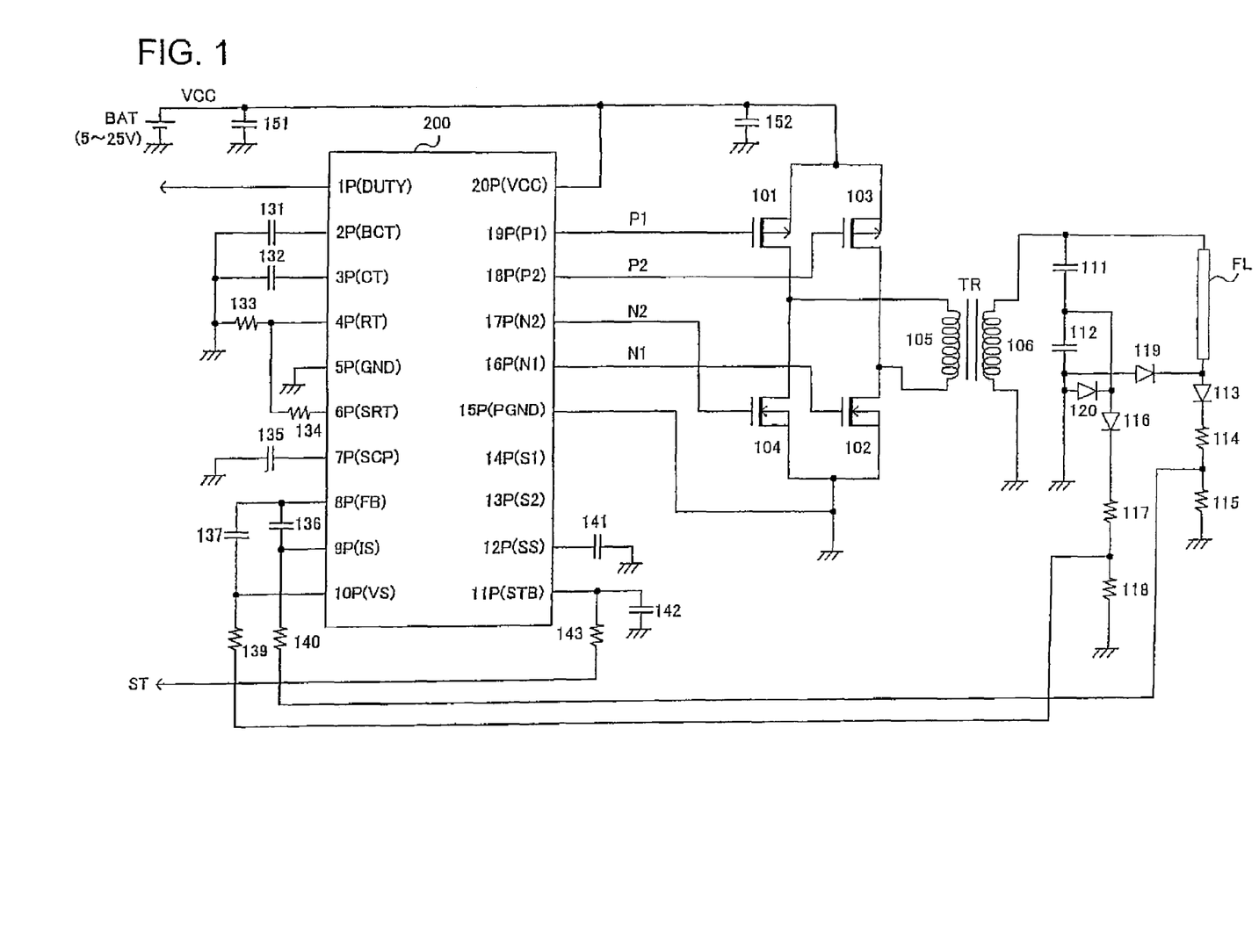
FIG. 1 is a schematic diagram showing an overall arrangement of an inverter in accordance with an embodiment of the invention.
Figure 2:
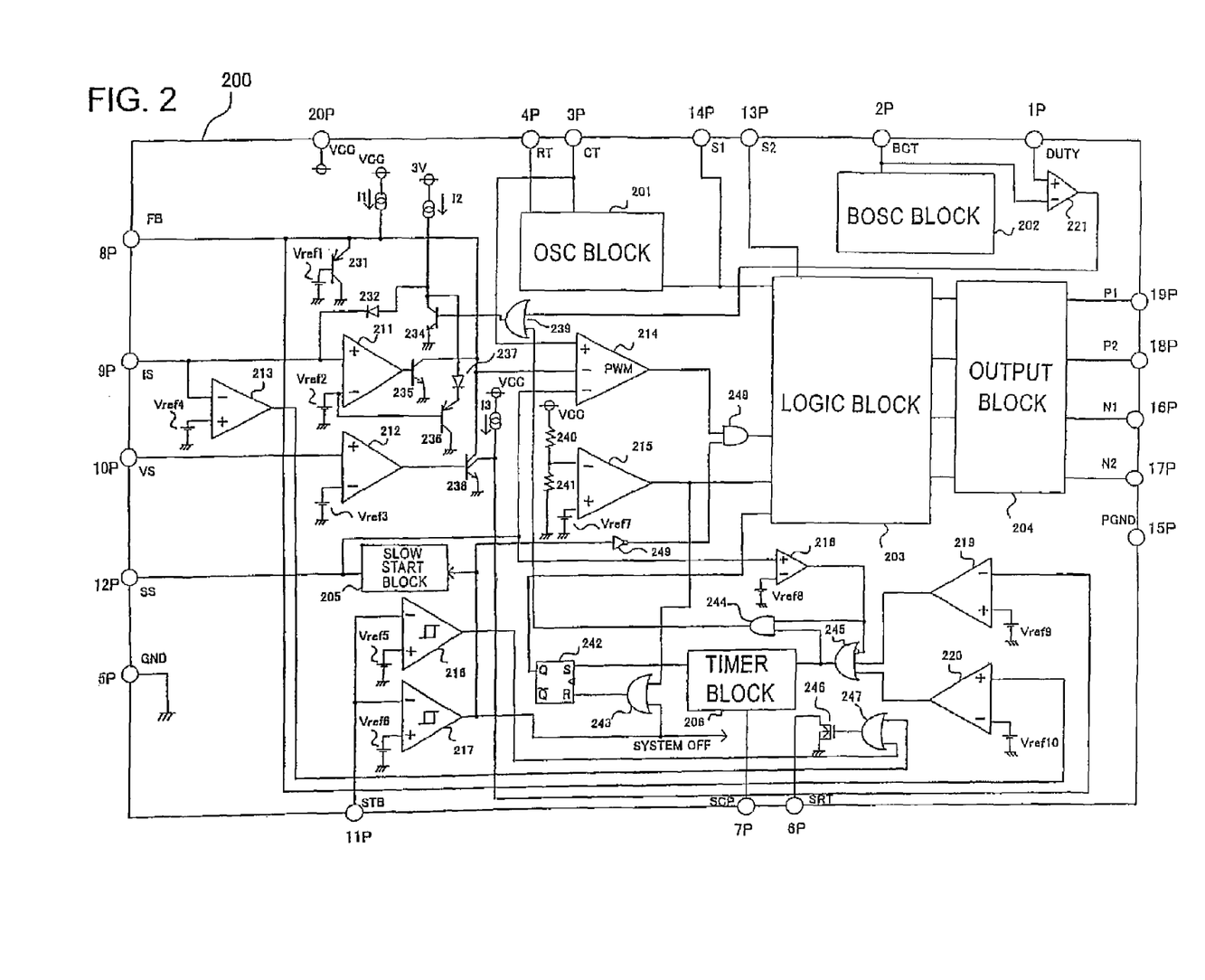
FIG. 2 is a schematic diagram showing an internal structure of a controller IC for use in the inverter of FIG. 1.

FIG. 1 is a diagram showing an overall arrangement of an inverter in accordance with a first embodiment of the invention, in which PWM control is performed using an insulated transformer and a full bridge-type switch circuit. FIG. 2 is a diagram showing the internal structure of a controller IC for controlling the inverter.

As shown in FIG. 1, a first switch in the form of a P-type MOSFET (hereinafter referred to as PMOS) 101 and a second switch in the form of an N-type MOSFET (hereinafter referred to as NMOS) 102 together constitute a first current path in a first (or forward) direction from a battery-BAT to the primary winding 105 of a transformer TR. A third PMOS switch 103 and a fourth NMOS switch 104 together constitute a second current path in the second (or reverse) direction from the battery BAT to the primary winding 105 of the transformer TR. Each of these PMOSs 101 and 103 and NMOSs 102 and 104 has a body diode (or back gate diode). With these body diodes, a current can be passed in the reverse direction opposite to the forward path. Additional diodes may be provided to provide the same function as the body diodes.

The primary winding 105 of the transformer TR is supplied with the power supply voltage VCC of the dc power supply BAT through the PMOSs 101 and 103 and NMOSs 102 and 104 to induce a high voltage across a secondary winding 106 of the transformer TR in accord with the winding ratio of the primary to the secondary windings. The induced high voltage is supplied to a cold cathode fluorescent light FL to turn it on.

Capacitors 111-112 and resistors 117-118 are provided to detect the voltage impressed on the cold cathode fluorescent light FL and feed the detected voltage back to a controller IC 200. Resistors 114-115 are provided to detect the current that flows through the cold cathode fluorescent light FL and feed it back to the controller IC 200. The capacitor 111 is adapted to resonate with the inductive transformer TR. The capacitance of the cold cathode fluorescent light FL also contributes to the resonance. Elements numbered 113,116,119, and 120 are diodes. Elements numbered 151 and 152 are capacitors provided to stabilize the power supply voltage.

The controller IC 200 has a multiplicity of input/output (I/O) pins. A first pin 1P is a mode switching terminal for switching the operation mode of the switching circuit between the PWM mode and the intermittent operation mode (hereinafter referred to as burst mode). The first pin 1P is externally supplied with a duty signal DUTY for switching the operation mode and for determining the duty cycle ratio during the burst mode. A second pin 2P is a terminal (capacitive connection terminal) for connection with a capacitor 131 of a burst mode oscillator (BOSC). The second pin 2P is connected to the capacitor 131 to generate across the capacitor a triangular wave signal BCT for initiating a burst (the signal hereinafter referred to as burst triangular wave signal).

A third pin 3P is a terminal for connection with a capacitor 132 to establish an oscillation frequency of a PWM mode oscillator (OSC). A triangular wave signal (i.e. triangular wave signal train) CT for PWM (referred to as PWM triangular wave signal) is generated at the third pin 3P connected to the capacitor 132. A fourth pin 4P is a terminal for connection with a resistor 133 for setting up a charge current to the third pin 3P. The fourth pin 4P has a potential RT, which causes a current to flow through the resistor 133 connected thereto in accord with the potential RT and the resistance of the resistor 133. A fifth pin 5P is an earth terminal having ground potential GND.

A sixth pin 6P is a terminal (referred to as charge current setting resistor terminal) for connection with a resistor for setting charge current to the capacitor 134 connected to the third pin 3P. The charge current setting resistor 134 connected to the sixth pin 6P is connected in parallel with the resistor 133 or disconnected therefrom, under the control of an internal circuit of the controller IC 200. The sixth pin 6P has a potential SRT, which equals either the ground potential GND or the potential RT of the fourth pin 4P. A seventh pin 7P is a terminal for connection with a capacitor 135 for setting a timer latch. The capacitor 135 when connected to the seventh pin 7P stores a charge, developing a voltage SCP in accord with the charge. The capacitor 135 determines the time limit of protective action to protect the internal circuit of the controller IC 200.

A ninth pin 9P is an input terminal for a first error amplifier. The ninth pin 9P is fed, via a resistor 140, a current detection signal (referred to as detection current) IS in accord with the current flowing through the cold cathode fluorescent light FL. The detection current IS is inputted into the first error amplifier. An eighth pin 8P is an output terminal of the first error amplifier. Connected between the eighth pin 8P and the ninth pin 9P is a capacitor 136. The potential of the eighth pin 8P serves as feedback control voltage FB for the PWM control. In what follows the ground potential is taken as a reference for voltage unless otherwise stated.

A tenth pin 10P is an input terminal of a second error amplifier. The tenth pin 10P is fed via a resistor 139 a voltage detection signal (hereinafter referred to as detection voltage) VS in accord with the voltage impressed on the cold cathode fluorescent light FL. The detection voltage VS is inputted into the second error amplifier. Connected between the tenth pin 10P and the eighth pin 8P is a capacitor 137.

An eleventh pin 11P is a terminal for setting starting time and for starting up the inverter. A signal STB is derived from a delayed startup signal ST by removing the noise therefrom by means of a resistor 143 and a capacitor 142, and is supplied to-an eleventh pin 11P. A twelfth pin 12P is a terminal for connection with a grounded capacitor 141 for setting slow start time. A slow start voltage SS gradually develops across the capacitor 141 during a startup.

A thirteenth pin 13P is a synchronization terminal to be connected to another controller IC when the controller 200 is to be synchronized therewith. A fourteenth pin 14P is an I/O terminal of the internal clock, for connection with another controller IC when the controller 200 is to collaborate with said another controller.

A fifteenth pin 15P is an earth terminal for an external FET drive circuit. A sixteenth pin 16P is a terminal for outputting a gate drive signal N1 of the NMOS 102. A seventeenth pin 17P is a terminal for outputting a gate drive signal N2 of the NMOS 104. An eighteenth pin 18P is a terminal for outputting a gate drive signal P2 of the PMOS 103. A nineteenth pin 19P is a terminal for outputting a gate drive signal P1 of the PMOS 101. A twentieth pin 20P is a power supply terminal for receiving the power supply voltage VCC.

As shown in FIG. 2 illustrating the internal structure of the controller IC 200, an oscillation (OSC) block 201 generates a PWM triangular wave signal CT having a period of cycle determined by the capacitor 132 connected to the third pin 3P and the resistors 133-134 connected to the fourth pin 4P, and supply the signal CT to a PWM comparator 214. The OSC block 201 also generates an internal clock and supplies it to a logic block 203.

A BOSC block 202 is an oscillation circuit (hereinafter referred to as burst triangular wave signal generation circuit) for generating burst triangular wave signal BCT having a frequency determined by the capacitor 131 connected to the second pin 2P. The frequency of the burst triangular wave signal BCT is set much lower than the frequency of the PWM triangular wave signal CT (i.e., BCT frequency<CT frequency). The dc voltage supplied to the first pin 1P (that is, analog duty signal DUTY) and the burst triangular wave signal BCT are compared in a comparator 221. The output of the comparator 221 is used to drive an NPN transistor (hereinafter referred to as NPN) 234 via an OR circuit 239. In a case where a digital (PWM) duty signal is supplied to the first pin 1P, a resistor is connected to the second pin 2P to output a predetermined burst voltage from the BOSC block 202.

The logic block 203 is supplied with a PWM control signal, for example, to generate a switch drive signal in accord with a predetermined logic. An output block 204 generates gate drive signals P1, P2, N1, and N2, in accord with the switch drive signal received from the logic block 203, and supplies them to the respective gates of the PMOSs 101 and 103 and NMOSs 102 and 104.

A slow start block 205 is supplied with the start up signal ST and is started up by the output of a comparator 217 when the slowly rising voltage STB raised by the capacitor 142 and resistor 143 and input to the comparator 217 exceeds a reference voltage Vref6. The output of the comparator 217 enables the logic block 203. Element 249 is an inversion circuit. The output of the comparator 217 resets a flip-flop (FF) circuit 242 via an OR circuit 243. As the start block 205 is started up, a slow start voltage SS, inputted to comparison input of the PWM comparator 214, gradually rises. Thus, during a startup, PWM is controlled by the slow start voltage SS.

It is noted that during a startup, the comparator 216 turns off an NMOS 246 via an OR circuit 247 when the input to the comparator 216 exceeds a reference voltage Vref5. This causes the resistor 134 to be separated from the controller IC 200 and the frequency of the PWM triangular wave signal CT to be changed. The OR circuit 247 is also fed with the output of a comparator 213.

A first error amplifier 211 compares the voltage indicative of the detection current IS that is proportional to the current flowing through the cold cathode fluorescent light FL with a reference voltage Vref2 (which is, for example, 1.25 V), and generates an output in accord with the error between them to control an NPN 235 connected to a constant current source I1. The collector of the NPN 235 is connected to the eighth pin 8P. Thus, the potential of the node (i.e. the eighth pin 8P) serves as the feedback voltage FB to be inputted to the PWM comparator 214 as a comparison input.

The PWM comparator 214 compares the PWM triangular wave signal CT with either one of the feedback voltage FB or the slow start voltage SS that has a lower voltage than the other to generate and provide PWM control signals to the logic block 203 via an AND circuit 248. Under a steady state condition reached subsequent to a startup, the PWM triangular wave signal CT is compared with the feedback voltage FB for automated control of the current flowing through the cold cathode fluorescent light FL at a preset level.

Because the capacitor 136 is connected between the eighth pin 8P and the ninth pin 9P, the feedback voltage FB increases and decreases smoothly. As a consequence, the PWM control is carried out smoothly, without an abrupt change.

A second error amplifier 212 compares the detection voltage VS that is proportional to the voltage across the cold cathode fluorescent light FL with a reference voltage Vref3 (which is 1.25 V, for example) to generate an output voltage indicative of the difference between them. This output is used to control a double collector type NPN 238 having one collector connected to the constant current source I1. Since the collector of the NPN 238 is also connected to the pin 8P, the feedback voltage FB is also controlled by the detection voltage VS. That is, the comparator 212 and the NPN 238 together constitute a feedback signal control circuit for controlling the feedback signal FB.

Incidentally, if the feedback voltage FB exceeds a reference voltage Vref1 (e.g. 3 V), a PNP transistor (hereinafter referred to as PNP) 231 will be switched on to limit excessive rise of the feedback voltage FB.

A comparator 215 compares the power supply voltage VCC with the voltage generated by dividing the power supply voltage VCC by resistors 240 and 241 and with a reference voltage Vref7 (e.g. 2.2 V), and, when the power supply voltage VCC reaches a predetermined level, inverts its output to reset the FF circuit 242 via the OR circuit 243.

A comparator 218 compares the slow start voltage SS with a reference voltage Vref8 (e.g. 2.2 V) to turn-on the NPN 234 via an AND circuit 244 and an OR circuit 239 when the voltage SS exceeds the reference voltage Vref8. The NPN 234, when turned on, causes a diode 232 to be reversely biased by a current source I2 and hence enables the first error amplifier 211 to perform its normal operation. Thus, the NPN 234, diode 232, and the current source I2 constitute a control mode switching circuit for switching the control mode between burst control and pulse width control mode.

When the NPN 238 having one of the double collectors connected to a constant current source I3 is turned on by the second error amplifier 212, its collector voltage lowers below a reference voltage Vref9 (e.g. 3 V). This causes the output voltage of a comparator 219 to be reversed. A comparator 220 compares the feedback voltage FB with a reference voltage Vref10 (e.g. 3 V), and inverts its output voltage when the feedback voltage FB exceeds the reference voltage. The outputs of the comparators 219 and 220 are inputted, along with the inverted output of the comparator 218, to a timer block 206 via an OR circuit 245. The timer measures time elapsed and outputs the inverted signal after a predetermined time later. The output of this timer block 206 is supplied to the FF 242 to reset it, the Q output of which in turn disables the logic block 203.

Figure 3:
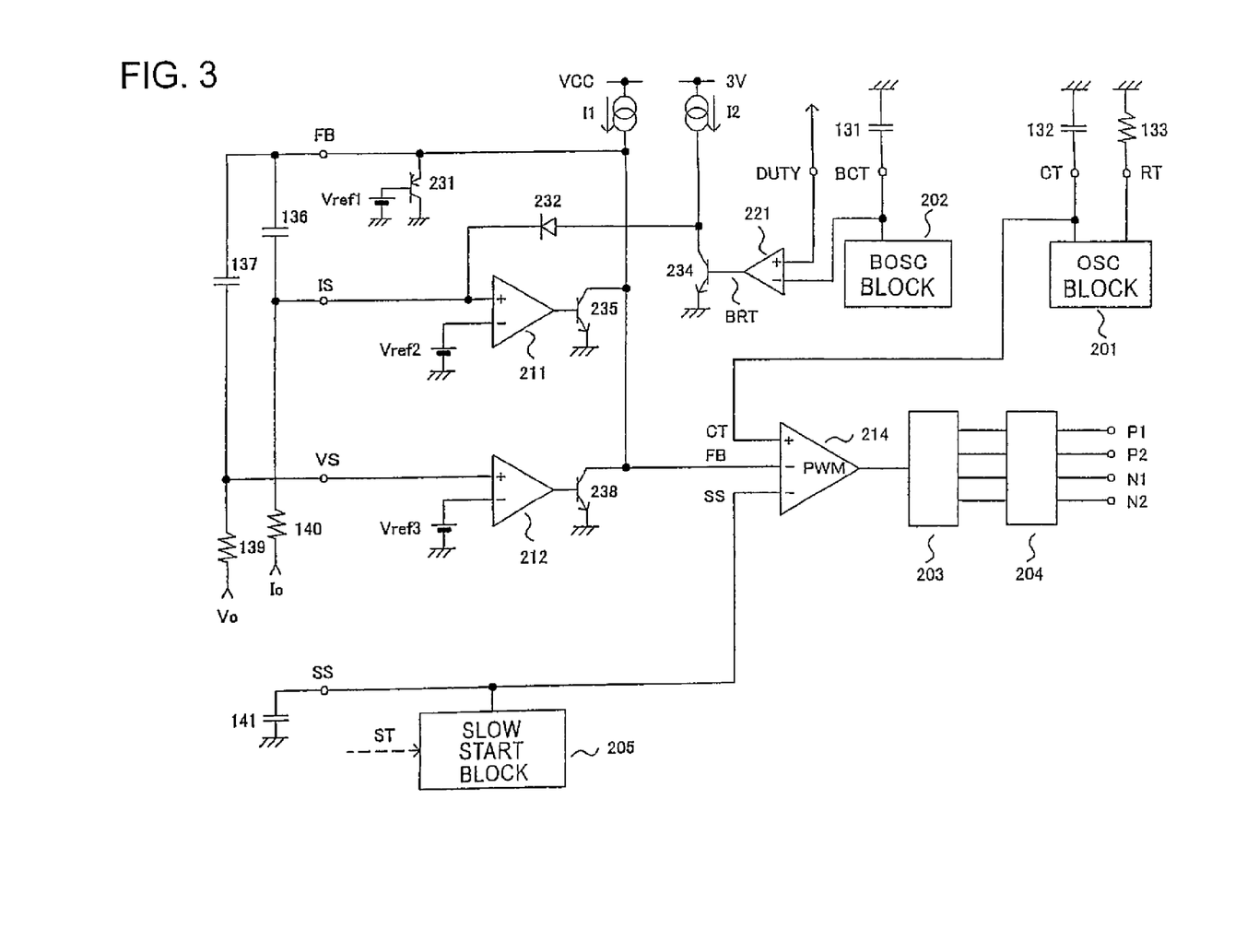
FIG. 3 is a circuit diagram useful in describing slow start and slow end of intermittent operation.
Figure 4:
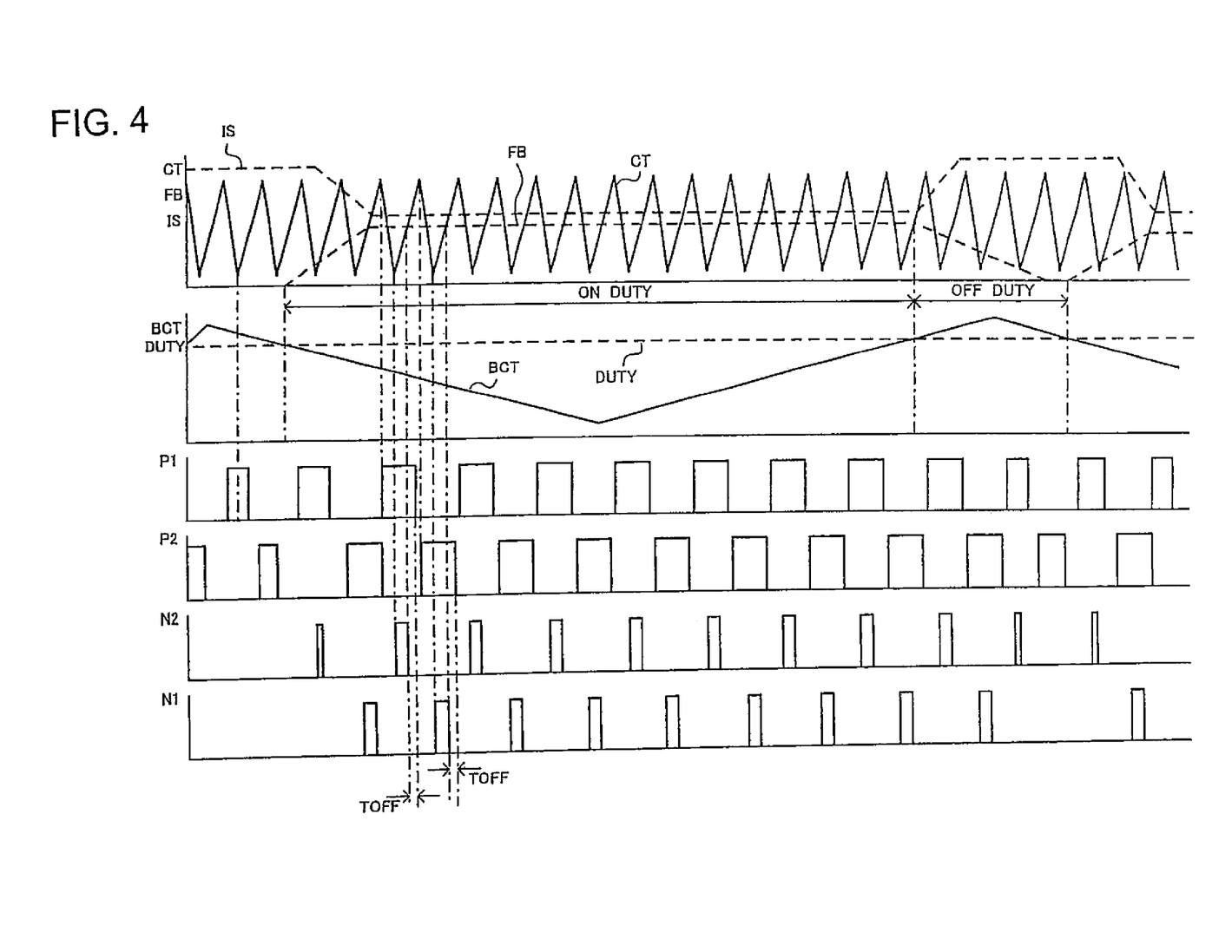
FIG. 4 is a timing diagram for the operation shown in FIG. 3.
Figure 5:
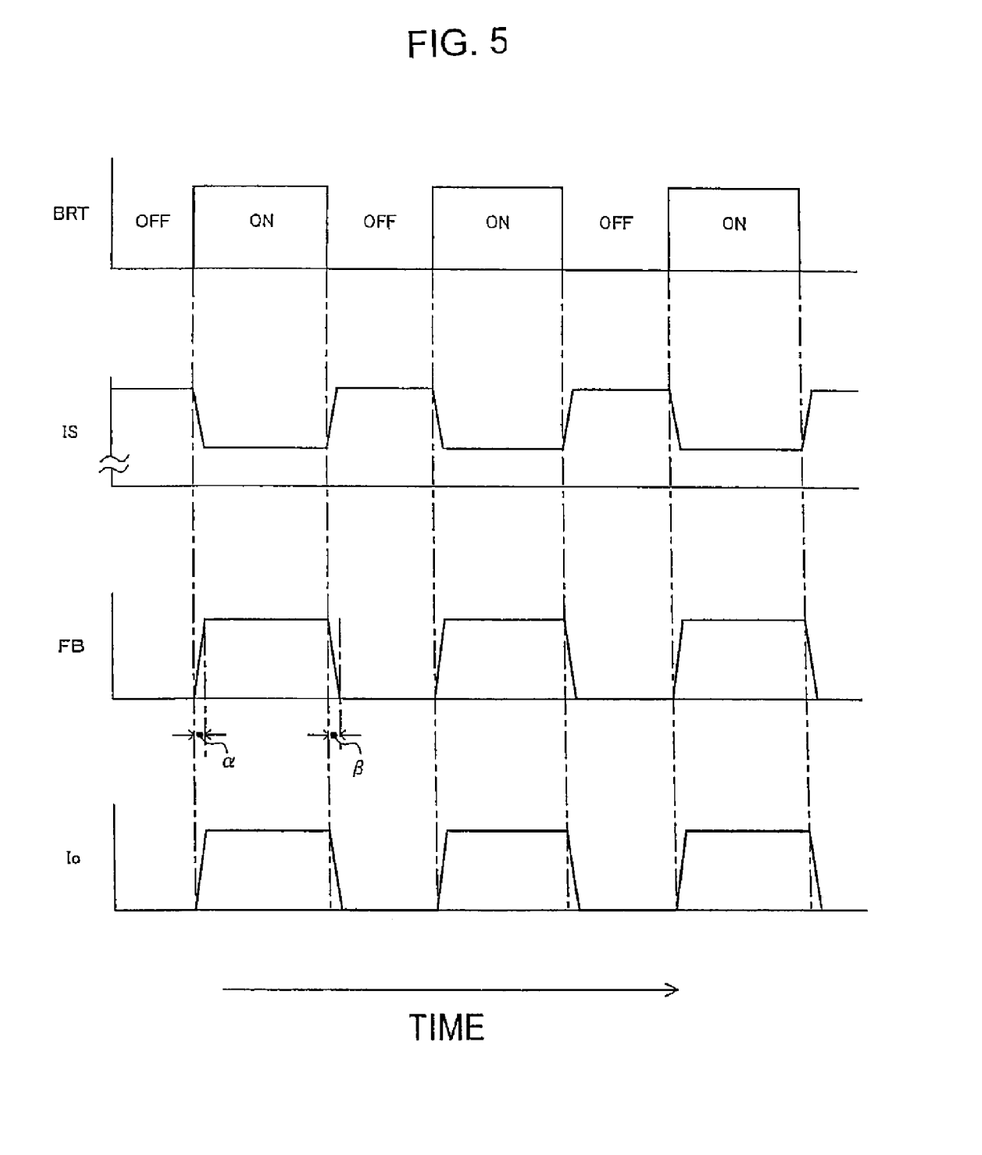
FIG. 5 is another timing diagram for the operation shown in FIG. 3.

Referring to FIGS. 3-5, operation modes of the inverter, particularly the modes of its operation during a startup and a burst, will now be described in detail. FIG. 3 shows a portion of the circuit of FIGS. 1 and 2 that takes part in slow start mode during a startup and a burst mode. FIGS. 4 and 5 are timing diagrams useful in describing the operation shown in FIG. 3.

The controller IC 200 is supplied with the power supply voltage VCC. The OSC block 201, the capacitor 132, and the resistor 133 together constitute a triangular wave signal generation circuit, which generates a triangular wave signal CT having a frequency determined by the capacitance of the capacitor 132 and the resistance of the resistor 133. This triangular wave signal. CT is inputted into (+)-input terminal of the PWM comparator 214.

The feedback voltage FB is supplied to one of the two (−)-input terminals of the PWM comparator 214. Thanks to a common circuit consisting of the constant current source I1 and the NPNs 235 and 238 and supplied with the power supply voltage VCC, the feedback voltage FB rises to a high level (upper limit of the feedback voltage) when the power supply voltage VCC is supplied to the PWM comparator 214. The feedback voltage FB is constrained to a constant level by the PNP 231 and the reference voltage Vref1.

However, the slow start voltage SE inputted to another (−)-input terminal of the PWM comparator 214 remains zero, since no startup signal ST is received. At this stage, the PWM comparator 214 outputs no PWM control signal yet, since the PWM comparator 214 prioritize a lower one of the feedback voltage FB and the slow start voltage SS.

As a startup signal ST is externally supplied to the slow start circuit represented by the start block 205, the constant current source inside the start block 205 is activated to supply a constant current to the capacitor 141. Then, since the capacitor 141 is charged by the constant current, the slow start voltage SS rises linearly with a predetermined slope. That is, the inverter undergoes slow start in the startup.

The slowly rising slow start voltage SS is compared with the PWM triangular wave signal CT in the PWM comparator 214, whereby a PWM control signal is outputted from the PWM comparator 214 in accord with the magnitude of the slow start voltage SS. This PWM control signal is supplied to the MOSFETs 101-104 via the logic block 203 and the output block 204 to initiate inverter operation.

Since the load of the inverter, i.e. cold cathode fluorescent light FL, will not be turned on until the voltage across the cold cathode fluorescent light FL reaches a predetermined magnitude, the output voltage Vo rises with the slow start voltage SS in an early stage of the slow startup. Therefore, unlike conventional inverters, the inventive inverter will not initially impress on the cold cathode fluorescent light FL an excessive output voltage Vo (as high as 2000-2500 V, for example) due to the initial feedback voltage FB at its upper limit. Moreover, since there can be no inrushing current that accompanies such excessive output voltage Vo, the cold cathode fluorescent light FL and the major circuit components (e.g. MOSFETs 101-104, transformer TR, battery BAT, etc.) of the inverter are greatly relieved of stress and damage arising from excessive voltages.

The output current Io of the inverter is detected and the detection current IS associated with the detected output current Io is inputted to the first error amplifier 211. The first error amplifier 211 compares the voltage indicative of the detection current IS with the reference voltage Vref2 to output a voltage for controlling the NPN 235. The output voltage Vo is also detected and the detection voltage VS associated therewith is inputted to the second error amplifier 212. The second error amplifier 212 compares the detection voltage VS with the reference voltage Vref3 and generates an output voltage to control the NPN 238. As the NPN 235 or NPN 238 is controlled by the detection current IS or the detection voltage VS, respectively, the feedback voltage FB begins to fall from the maximum upper level.

As the output voltage Vo rises and reaches the startup voltage (about 1000 V), the output current Io begins to flow, turning on the cold cathode fluorescent light FL, which in turn causes the output voltage Vo to fall to a predetermined operating voltage (about 600 V). It is noted that no excessive inrushing current will flow at-this point. The output current Io gradually rises up, while the output voltage Vo remains at the substantially constant operating voltage. As the output voltage Vo or the output current Io grows larger, causing the NPN 235 and 238 to be controlled, the feedback voltage FB is gradually lowered from the maximum upper level by the feedback action of the capacitor 136 and 137.

As the slow start voltage SS rises, the output current Io increases while the feedback voltage FB decreases. When the feedback voltage FB becomes equal to the slow start voltage SS, the PWM comparator 214 begins to compare the PWM triangular wave signal CT with the feedback voltage FB in place of the slow start voltage SS that has been so far compared with the PWM triangular wave signal CT. This completes the slow start. The time required for the slow start is fairly long, since it takes time to start up the disabled cold cathode fluorescent light FL.

The output current Io is controlled to remain at a predetermined constant level determined by the reference voltage Vief2. The luminance of the cold cathode fluorescent light FL is determined by the magnitude of the current flowing through it. Hence, in order to maintain this current, a substantially constant operating voltage must be applied to the cold cathode fluorescent light FL. Therefore, in order to turn on the cold cathode fluorescent light FL, the output voltage Vo is brought to a high level during a startup, but it can be lowered to a low operating voltage once the fluorescent light FL is turned on. Hence, the level of the feedback voltage FB in a steady state (i.e. when the fluorescent light FL has been turned on) is determined based on the Magnitude of the output current Io.

Incidentally, the start block 205 may be provided with a discharge circuit for discharging the charge stored in the capacitor 141 in preparation for the next startup following a shutdown of the inverter. The discharge of the capacitor 141 may be executed by the startup signal ST.

Thus, during a startup, by allowing slow start to be executed in common for the output voltage Vo and the output current Io supplied to the cold cathode fluorescent lamp under PWM control, an abnormally excessive voltage and an excessive inrushing current can be prevented from occurring in the cold cathode fluorescent light FL.

It should be understood that the outputs of the first error amplifier 211 and of the second error amplifier 212 may be directly inputted to the PWM comparator 214 without passing through the common circuit consisting of NPN 235 and NPN 238. This can be done by:

providing the PWM comparator 214 with three (−)-input terminals;

inverting the polarities of the inverting (−)-input terminals and non-inverting (+)-terminals of the first and second error amplifiers 211 and 212;

providing separate feedback loops to the respective capacitors 136 and 137; and inputting the PWM triangular wave signal CT in the (+)-input terminal of the PWM comparator 214, and inputting the outputs of the first and second error amplifiers 211 and 212, along with the slow start signal SS, in the three (−)-input terminals.

Next, the inventive burst mode will be described. Under the condition where the controller IC 200 is supplied with the power supply voltage VCC, the burst triangular wave signal BCT is generated by the burst triangular wave signal generating circuit that consists of the BOSC block 202 oscillating a burst triangular wave signal and a capacitor 131. The frequency of the burst triangular wave signal BCT is determined by the capacitance of the capacitor 131 and the internal resistance of the BOSC block 202. The burst mode may be controlled by changing the level of the duty signal DUTY as to whether or not the burst triangular wave signal BCT should exceed the duty signal DUTY and, if it should, how long it should.

The PWM control is performed during on-duty periods (ON DUTY) in which the duty signal DUTY exceeds the burst triangular wave signal BCT, as shown in FIG. 4. On the other hand, during off-duty periods (OFF DUTY) in which the duty signal DUTY is lower than the burst triangular wave signal BCT, the PWM control is stopped to stop supplying power to the cold cathode fluorescent light FL.

The frequency of the PWM triangular wave signal CT may be, for example, 120 kHz. Since the PWM triangular wave signal CT is controlled by the burst triangular wave signal BCT having a frequency of, for example, 150 Hz, no visual problem will be encountered. By controlling the magnitude of the duty signal DUTY, it is possible to control the power supplied to the cold cathode fluorescent light FL (i.e. to control the amount of light emitted by the cold cathode fluorescent light FL) beyond the control range that can be attained solely by the PWM control.

Further details of the operation of the inverter will now be described with reference to FIGS. 4 and 5. During off-duty periods, the intermittent operational signal (burst signal) BRT outputted from the comparator 221 has a low level (L level) which causes the NPN 234 to be turned off, thereby biasing the diode 232 in the forward direction by the constant current source I2, The capacitor 136 of the feedback circuit is charged by the constant current source I2 via the diode 232. Hence, the detection current IS is pulled up to a high level (H level), bringing the error output of the first error amplifier 211 to the high level. Since the NPN 235 is turned on, the feedback voltage FB is about zero voltage.

The PWM comparator 214 compares the PWM triangular wave signal CT inputted to the positive (+)-input terminal with lower one of the two incoming signals inputted to the two negative (−) input terminals. Accordingly, during off-duty periods, the PWM control signal is not outputted, as shown in the left part of FIG. 4.

At time t1 at which the duty cycle shifts from an off-duty period to an on-duty period (referred to as off-on duty shift), the burst signal BRT changes from the L level to the H level, thereby causing the NPN 234 to be turned on. This in turn liberates the diode 232 from the forward bias imposed thereon by the constant current source I2.

The electric charge stored in the capacitor 136 is discharged through a conduction path coupling the constant current source I1, capacitor 136, resistor 140, and resistor 115. This discharge of the capacitor 136 causes the detection current IS to slowly decrease and the feedback voltage FB to slowly rise, thereby allowing the detection current IS to restore the predetermined level and the inverter resumes the normal PWM control.

In this way, in an off-on duty shift, the feedback voltage FB rises slowly from substantially zero voltage over a time interval (rise time) (represented by "α" in FIG. 5) determined by the time constant of the capacitor 136 coupled with the resistors 140 and 115. Since the narrow pulse width of the PWM control signal then gradually becomes wider, the output current Io also increases slowly, i.e. it undergoes slow start. Hence, there will be no overshoot in the output current Io accompanying an off-on duty shift.

During on-duty periods, the burst signal BRT has the H level, which causes the NPN 234 to be turned on but the diode 234 to be turned off under the reverse bias. Under this condition, the first error amplifier 211 generates an output in accord with the magnitude of the detection current IS inputted thereto to control the conductivity of the NPN 235.

Accordingly, the PWM control signal is supplied from the PWM comparator 214 to the logic block 203. Gate drive signals P1-N2 are supplied from the output block 204 to the PMOSs 101 and 103 and NMOSs 102 and 104, respectively, for PWM control of these transistors. Incidentally, a short period TOFF shown in FIG. 4 is provided to have the paired transistors simultaneous turned off to prevent a penetration current from occurring.

When a shift from an on-duty period to an off-duty period (referred to as on-off duty shift) is made at time t2, the burst signal BRT changes from the H level to the L level to turn off the NPN 234, thereby causing the diode 232 to be biased in the forward direction by the constant current source 12.

Then the capacitor 136 is charged by the current that flows from the constant current source I2 to the NPN 235 through the capacitor 136. The charging of the capacitor 136 causes the detection current IS-to slowly increase and the feedback voltage FB to slowly decrease (over a time interval (fall time) "β") as shown in FIG. 5. The detection current IS will reach its upper limit (which equals the power supply voltage of 3 Volts of the constant current source I2), while the feedback voltage FB will decreases-to about zero voltage. Then the PWM control is stopped.

In this way, when an on-off duty shift is made in the PWM control, the feedback voltage FB slowly decreases from its substantial full level in the PWM control towards zero over the charging time of the capacitor 136 (or period β). That is, the on-off duty shift undergoes slow end. As a consequence, the pulse width of the PWM control signal gradually decreases from its ordinary pulse width. Hence, the output current Io gradually decreases during the on-off duty shift.

In a burst mode, unlike a startup operation, the cold cathode fluorescent light FL is already turned on, so that the period of slow start and of slow end can be made shorter than the corresponding period of the slow start during a startup.

If use were made of a circuit for establishing soft start in the startup also in the slow start and slow end of burst mode, rising time α and falling time β would be too long for the burst mode. Hence it would be difficult to precisely control the load current. Conversely, if use were made of circuits for establishing slow start and slow end in bust mode also in the soft start of the startup, incoming current during the startup could not be suppressed effectively.

It should be noted that in accordance with the invention slow start and slow end of the burst mode can be controlled by the capacitor 136 provided in the feedback circuit that determines the rise time α and the fall time β. As a result, adequate slow start and slow end can be implemented using the circuit elements for executing the PWM control, without resorting to any other special circuit means.

INDUSTRIAL APPLICABILITY

As described above, a dc converter and a controller IC therefor of the invention are suitable for use as a backlight power supply for a liquid crystal display that requires a high ac voltage derived from a low-voltage dc power supply.

The invention claimed is:

1. A controller IC for controlling the ac power to be supplied to a load by driving a semiconductor switch circuit, said controller IC comprising:
   a current detection signal input terminal for receiving a current detection signal formed on the basis of the current through said load;
   a PWM control signal generation circuit adapted to generate an error signal based on said current detection signal inputted into said current detection signal input terminal, and generate a PWM control signal for switching on and off said semiconductor switch circuit based on said error signal;
   an intermittent operation signal generation circuit for generating an intermittent operation signal that intermittently changes its state between a first and a second state; and
   an intermittent operation control circuit connected to said intermittent operation signal generation circuit within said controller IC, said intermittent operation control circuit adapted to stop the switching of said semiconductor switch circuit effected by said PWM control signal generation circuit when said intermittent operation signal is in said first state.

2. The controller IC according to claim 1, wherein said intermittent operation signal is inputted into said PWM control signal generation circuit.

3. The controller IC according to claim 1, wherein said intermittent operation control circuit is connected to said current detection signal input terminal, and has:
   a current source for providing a constant current;
   a switch connected to one end of said current source and switched on and off based on said intermittent operation signal; and
   a diode for supplying current from said current source to said current detection signal input terminal when said intermittent operation signal is in said first state.

4. The controller IC according to any one of claims 1 through 3, wherein said PWM control signal generation circuit has an error amplifier for generating said error signal based on said current detection signal and a reference signal, and is adapted to switch on and off said semiconductor switch circuit based on said error signal.

5. The controller IC according to claim 4, wherein said intermittent operation signal is inputted into said error amplifier and causes said error signal to be set to substantially zero level when said intermittent operation control signal is in said first state.

6. The controller IC according to any one of claims 1 through 3, further comprising an error signal output terminal for outputting said error signal from said controller IC.

7. A control circuit, comprising:
   the controller IC according to claim 6; and
   a capacitor connected between said current detection signal input terminal and error signal output terminal of said controller IC.

8. The controller IC according to claim 1, further comprising
   a current source for providing a constant current, wherein said intermittent operation control circuit sets said error signal to substantially zero level when said intermittent operation signal is in said first state by allowing said current from said current source to flow from said current detection signal input terminal out of said controller IC.

9. A control circuit, comprising:
   the controller IC according to claim 8; and
   a capacitor connected to said current detection signal input terminal of said controller IC in such a way that the voltage of said current detection signal input terminal raised by said capacitor charged by the current from said current detection signal input terminal sets said error signal to substantially zero level.

10. A dc-ac converter, comprising:
    the controller IC according to claim 1;

a semiconductor switch circuit that is switched on and off by said PWM control signal outputted from said controller IC;

a transformer having a primary winding connected to said semiconductor switch circuit and at least one secondary winding; and a load connected to said secondary winding of said transformer.

11. The dc-ac converter according to claim 10, further comprising a current detection circuit for outputting a current detection signal based on the current through said load, said current detection signal fed to said controller IC from said current detection signal input terminal of said controller IC.

12. The dc-ac converter according to claim 10 or 11, wherein said load is a CCFL.

13. The controller IC according to claim 1, further comprising:

at least one PWM control signal output terminal for outputting said PWM control signal to switch on and off said semiconductor switch circuit;

a terminal to be connected to an oscillation frequency setting capacitor for determining the oscillation frequency of the output of said intermittent operation signal generation circuit changing between said first and second states; and a duty ratio determination terminal for inputting into said intermittent operation signal generation circuit an external duty signal to determine the duty ratio of said intermittent operation signal in intermittent operation.

14. A controller IC for controlling the ac power to be supplied to a load by driving a semiconductor switch circuit, said controller IC comprising:

a current detection signal input terminal for receiving a current detection signal formed on the basis of the current through said load;

a PWM control signal generation circuit for generating a PWM control signal to switch on and off said semiconductor switch circuit based on said current detection signal;

four PWM control signal output terminals for outputting said PWM control signal;

a terminal (intermittent operation capacitor connection terminal) for connecting an oscillation frequency setting capacitor for setting up a frequency of said PWM control signal generation circuit in intermittent operation;

a duty ratio determination terminal for receiving a duty signal to determine the duty ratio of a signal for executing said intermittent operation; and internal wiring connection for internally coupling, to said PWM control signal generation circuit, an intermittent operation signal having a duty ratio determined on the basis of the signal appearing at said intermittent operation capacitor connection terminal and on the basis of the duty signal appearing at said duty ratio determination terminal so to intermittently stop the switching signal from the output terminal of said semiconductor switch circuit at said duty ratio.

15. The controller IC according to claim 14, further comprising a terminal for connecting thereto a capacitor for determining the slow start period of the switching of said PWM control signal generation circuit.

16. A controller for controlling the ac power to be supplied to a load by driving a semiconductor switch circuit, said controller IC comprising:

a PWM triangular wave signal generation block for generating a PWM triangular wave signal;

a current detection signal input terminal for receiving a current detection signal formed on the basis of the current through said load;

a PWM control signal generation circuit for generating a PWM control signal, upon receipt of said PWM triangular wave signal and current detection signal inputted to said current detection signal input terminal, by comparing said PWM triangular wave signal with an error signal formed on the basis of said current detection signal;

an intermittent operation signal generation circuit for generating an intermittent operation signal that intermittently changes its state between a first and a second state; and an intermittent operation control circuit having a current source for providing a constant current, a switch that is switched on and off based on said intermittent operation signal, and a diode for supplying current from said current source to said current detection signal input terminal when said intermittent operation signal is in said first state.

* * * * *